United States Patent
Suzuki et al.

(10) Patent No.: US 6,928,236 B2
(45) Date of Patent: Aug. 9, 2005

(54) AIRCRAFT GALLEY

(75) Inventors: Shigeo Suzuki, Tokyo (JP); Hiroyuki Hozumi, Tokyo (JP)

(73) Assignee: Jamco Corporation, Tokyo (JP)

( * ) Notice: Subject to any disclaimer, the term of this patent is extended or adjusted under 35 U.S.C. 154(b) by 0 days.

(21) Appl. No.: 10/788,422

(22) Filed: Mar. 1, 2004

(65) Prior Publication Data

US 2005/0074231 A1 Apr. 7, 2005

(30) Foreign Application Priority Data

Oct. 2, 2003 (JP) ........................................ 2003-344229

(51) Int. Cl.[7] .............................................. A47J 27/21
(52) U.S. Cl. .......................... 392/444; 392/441; 392/466
(58) Field of Search ................................ 392/441–449, 392/451, 450, 465, 466

(56) References Cited

U.S. PATENT DOCUMENTS 4,702,153 A    10/1987  Grabow ........................... 98/1
5,351,337 A  *  9/1994  Deutsch ....................... 392/450
2003/0012564 A1  1/2003  Brache ......................... 392/451

FOREIGN PATENT DOCUMENTS

JP            10-155562         6/1998

* cited by examiner

Primary Examiner—Thor S. Campbell
(74) Attorney, Agent, or Firm—Westerman, Hattori, Daniels & Adrian, LLP

(57) ABSTRACT

A galley 1 has a main body 10 constructed of a panel material, and the galley main body 10 has a table 20, a sink 30, a storage compartment 40 and a service cart housing compartment 60. A hot-water supply unit 100 has a hot-water tank 10 with an electric heater and an electric instantaneous water heater 120 and is supplied with electric power by a control unit 150. The hot-water tank 110 and a hot-water tap 180 are connected via a hot-water supply line 190. In response to a command from a device that manages the electric power in the aircraft, the control unit 150 provides hot water using the instantaneous water heater 120 when the electric power consumption in the aircraft is low.

2 Claims, 2 Drawing Sheets

AIRCRAFT GALLEY

FILED OF THE INVENTION

The present invention relates to an improvement of a galley installed in an aircraft and used for providing food and drink to passengers or the like.

DESCRIPTION OF THE RELATED ART

With the up sizing of aircrafts and increase in flight time, there is increasing demand to improve the food and drink services offered to passengers.

For example, the following patent reference discloses a method of serving a set of dishes to passengers in an aircraft. Patent reference: Japanese Patent Laid-Open No. 10-155562

A galley is equipped with an electric outlet for supplying power to a heater of a service cart, a hot-water supply unit or the like and consumes a large amount of electricity when preparing meals.

In addition, in the hot-water supply unit, the temperature of the hot water decreases while the hot water passes through the line from a hot-water tank to an outlet tap, and this may be disadvantageous in brewing coffee or the like.

SUMMARY OF THE INVENTION

The present invention provides a galley which heats water and supplies the heated water to a hot water tank when the electric power consumption in the aircraft is low, thereby allowing hot water to be supplied immediately when a tap is opened.

An aircraft galley according to the present invention comprises: a galley body constructed of a panel material and having a storage compartment; a table and a sink provided in the galley body; a hot-water tap provided above the sink; and a hot-water supply unit for supplying hot water to the hot-water tap. The hot-water supply unit has a hot-water tank with an electric heater, an electric instantaneous water heater provided adjacent to the hot-water tank, a hot-water supply line interconnecting the hot-water tank and the hot-water tap, and a control unit for controlling the electric power supplied to the heater of the hot-water tank and the instantaneous water heater, and the control unit controls the electric power supply according to a command from a management unit which manages the electric power in the aircraft.

In addition, the hot-water supply line interconnecting the hot-water tank and the hot-water tap comprises a hot-water supply pipe for supplying hot water in the hot-water tank to the hot-water tap and a recycling pipe for returning hot water immediately before reaching the hot-water tap in the hot-water pipe to the hot-water tank.

With the galley according to the present invention, hot water can be used anytime, and any temperature reduction of hot water immediately after opening of a tap can be prevented.

DETAILED DESCRIPTION OF THE PREFERRED EMBODIMENT

Figure 1:
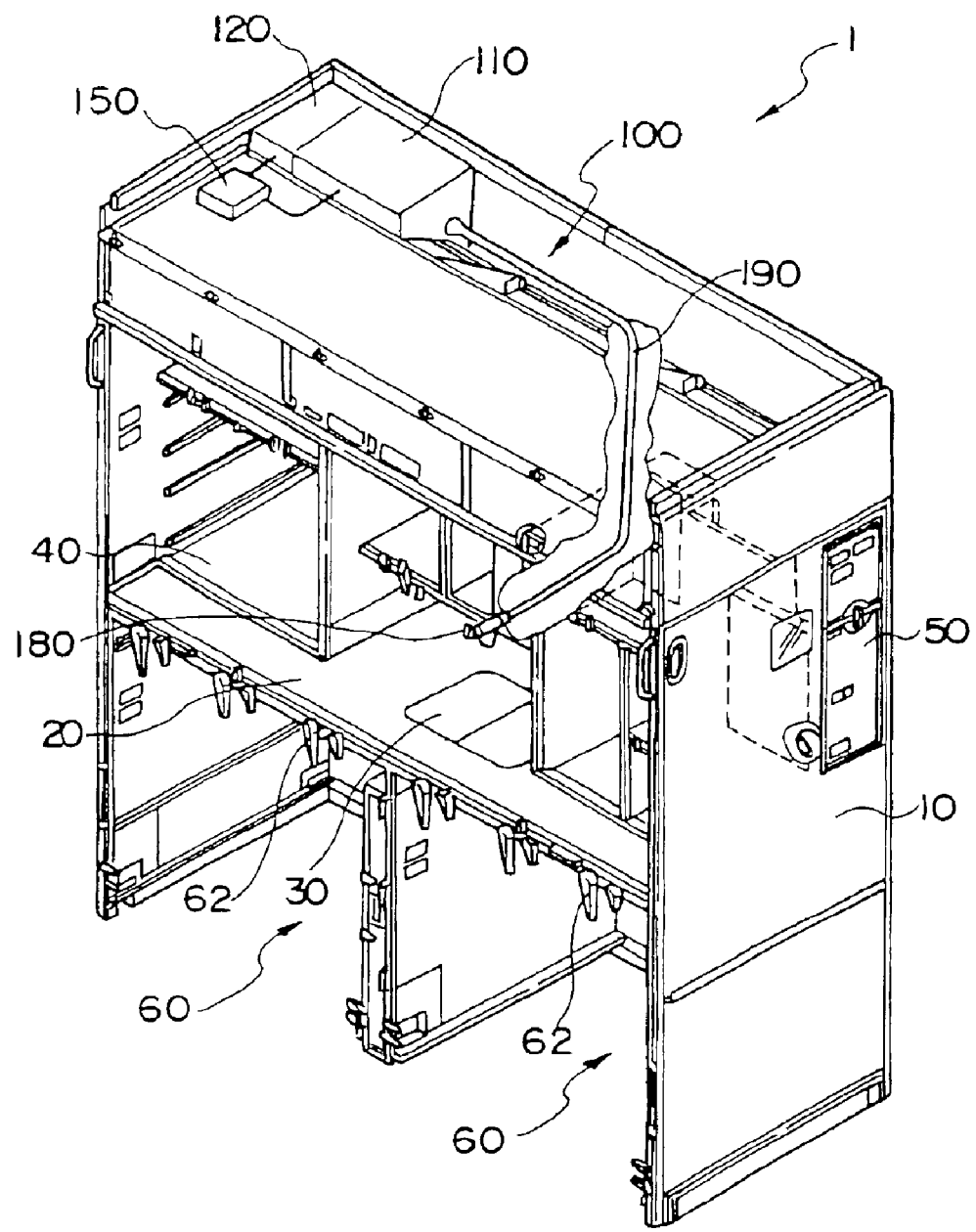
FIG. 1 is a perspective view of an aircraft galley according to the present invention.

FIG. 1 is a diagram showing an aircraft galley according to an embodiment of the present invention.

A galley generally denoted by reference numeral 1 comprises a main body 10 constructed of a lightweight and highly rigid panel material, such as a honeycomb panel.

In the main body 10, a kitchen table 20 and a sink 30 are provided. The main body 10 has a plurality of storage compartments 40, 50, which store food and drink to be provided to passengers, eating utensils or the like.

In a lower part of the main body 10, a service cart housing compartment 60 is provided. A service cart containing trays with eating utensils put thereon is prepared before departure at an airport and remains in the housing compartment 60 until the meal service is started. The service cart in the housing compartment 60 is connected to an electric circuit in the main body 10 via a connector (not shown).

A heater in the service cart is turned on at a predetermined time to heat hot meals.

If the power supply to the service carts is performed at once, a large amount of electricity is consumed. Thus, an electric control circuit is configured to adequately manage the electric power utilization by controlling the timings of supplying electric power to the service carts according to the timings of using the service carts.

To keep the housed service cart steady, the main body 10 has a plurality of stoppers 62 attached to the front face thereof.

On an upper part of the main body 10, a hot-water supply unit 100 according to the present invention is installed.

The hot-water supply unit 100 comprises a hot-water tank 110 provided on a ceiling of the galley main body 10, an instantaneous water heater 120, a hot-water tap 180 provided above the sink 30, and a hot-water supply line 190 interconnecting the hot-water tank 110 and the hot-water tap 180.

Figure 2:
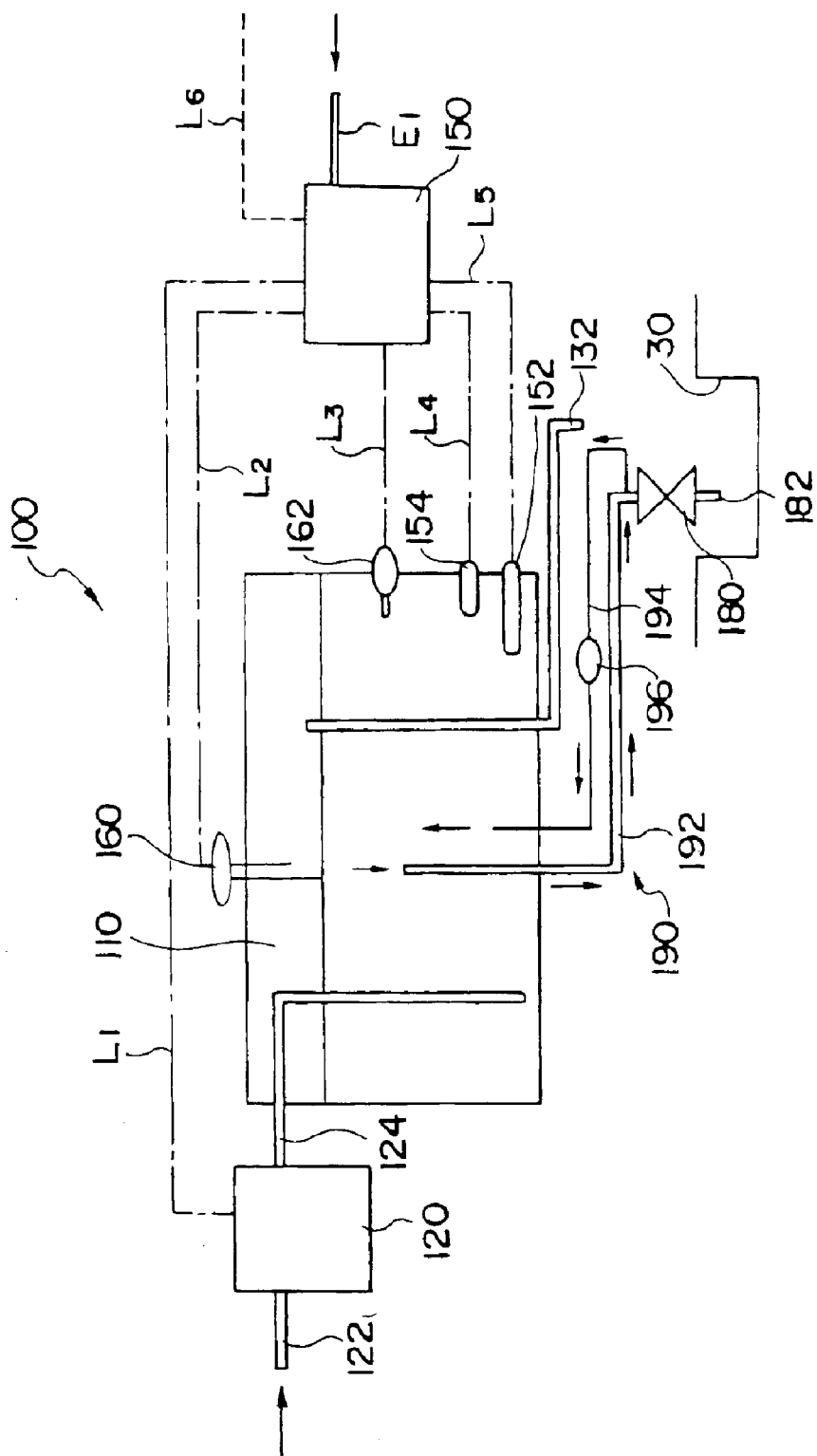
FIG. 2 is a system diagram of a hot-water supply unit according to the present invention.

FIG. 2 shows the hot-water supply unit 100 according to the present invention in detail.

The instantaneous water heater 120, which is provided adjacent to the hot-water tank 110, comprises an electric heater. The instantaneous water heater 120 heats, in a short time, the water supplied thereto via a water supply line 122 by electric power fed from a control unit 150 via a line $L_1$ and supplies the resulting hot water to the hot-water tank 110 via a line 124.

The hot-water tank 110 has a level sensor 160, a temperature sensor 162 or the like and transmits information from the sensors to the control unit 150 via lines $L_2$ and $L_3$.

A primary heater 152 attached to the hot-water tank 110 heats the hot water in the hot-water tank 110 to nearly the boiling point by electric power supplied by the control unit 150 via a line $L_5$.

The control unit 150 is connected to a power supply via an electric power line $E_1$ and receives a command from an electric power management unit via a line $L_6$. A secondary heater 154 provided on the hot-water tank 110 keeps the hot water in the tank 110 at a preset temperature by electric power supplied from the control unit 150 via a line $L_4$.

An over flow pipe 132, whose inlet end is located in an upper space in the hot-water tank 110, is to discharge over flow hot water in the tank to the sink 30 or another drainage line.

The hot-water supply line generally denoted by reference numeral 190 comprises a hot-water supply pipe 192 for feeding the hot water in the hot-water tank 110 to the hot-water tap 180, and a recycling pipe 194 for returning the hot-water immediately before reaching the hot-water tap 180 to the hot-water tank 110.

If a flight attendant or the like opens the hot-water tap 180 to brew tea, coffee or the like, hot water in the hot-water supply pipe 192 flows out from a faucet 182.

If the tap is closed for a long time, the temperature of the hot water in the hot-water supply pipe 192 may drop, and the temperature of the hot water flowing out from the faucet immediately after opening of the tap may be insufficient for brewing tea or coffee.

However, the hot-water supply unit according to the present invention has means for returning the hot water immediately before reaching the hot-water tap in the hot-water supply pipe 192 to the hot-water tank 110 through the recycling pipe 194.

Thus, hot water being heated sufficiently in the hot-water tank 110 is always prepared in the part of the hot-water supply pipe 192 which is immediately before the hot-water tap 180. Therefore, even immediately after opening of the tap, hot water having an adequate high temperature can be used.

The recycling pipe 194 may have a small pump 196 at some midpoint thereof to provide a pressure for compensating for the water level difference between the hot-water tank 110 and the hot-water tap 180.

As described above, according to the present invention, the electric power can be efficiently used in the aircraft to provide hot water for cooking, and the temperature of the hot water immediately after opening of the tap is prevented from dropping.

What is claimed is:

1. An aircraft galley for preparing food and drink, comprising:

a galley body constructed of a panel material and having a storage compartment; a table and a sink provided in the galley body; a hot-water tap provided above the sink; and a hot-water supply unit for supplying hot water to the hot-water tap, wherein the hot-water supply unit has a hot-water tank with an electric heater, an electric instantaneous water heater provided adjacent to the hot-water tank, a hot-water supply line interconnecting the hot-water tank and the hot-water tap, and a control unit for controlling the electric power supplied to the heater of the hot-water tank and the instantaneous water heater, and the control unit controls the electric power supply according to a command from a management unit which manages the electric power in the aircraft.

2. The aircraft galley according to claim 1, wherein the hot-water supply line interconnecting the hot-water tank and the hot-water tap comprises a hot-water supply pipe for supplying hot water in the hot-water tank to the hot-water tap and a recycling pipe for returning hot water immediately before reaching the hot-water tap in the hot-water pipe to the hot-water tank.

* * * * *